United States Patent
Lee et al.

(10) Patent No.: US 11,908,623 B2
(45) Date of Patent: Feb. 20, 2024

(54) MULTILAYER CAPACITOR HAVING INTERNAL ELECTRODE WITH DOUBLE BOTTLENECK STRUCTURE

(71) Applicant: SAMSUNG ELECTRO-MECHANICS CO., LTD., Suwon-si (KR)

(72) Inventors: Jong Ho Lee, Suwon-si (KR); Myung Chan Son, Suwon-si (KR); Sim Chung Kang, Suwon-si (KR); Eun Jin Shim, Suwon-si (KR); Sun Hwa Kim, Suwon-si (KR); Byung Soo Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 121 days.

(21) Appl. No.: 17/205,274

(22) Filed: Mar. 18, 2021

(65) Prior Publication Data

US 2022/0115181 A1 Apr. 14, 2022

(30) Foreign Application Priority Data

Oct. 12, 2020 (KR) .................. 10-2020-0131113

(51) Int. Cl.
*H01G 4/005* (2006.01)
*H01G 4/232* (2006.01)
(Continued)

(52) U.S. Cl.
CPC ............. *H01G 4/005* (2013.01); *H01G 4/232* (2013.01); *H01G 4/248* (2013.01); *H01G 4/30* (2013.01)

(58) Field of Classification Search
CPC ........ H01G 4/005; H01G 4/30; H01G 4/0085; H01G 4/012; H01G 4/1227
See application file for complete search history.

(56) References Cited

U.S. PATENT DOCUMENTS

| | | | | |
|---|---|---|---|---|
| 2004/0027787 A1* | 2/2004 | Yamauchi | .............. | H01G 4/012 361/321.2 |
| 2011/0002082 A1* | 1/2011 | Bultitude | .............. | H01G 4/005 29/25.42 |
| 2012/0106025 A1* | 5/2012 | Jeong | ..................... | H01G 4/012 29/25.42 |

(Continued)

FOREIGN PATENT DOCUMENTS

| | | | | |
|---|---|---|---|---|
| CN | 108155014 A | * | 6/2018 | .............. H01G 4/30 |
| JP | 02312217 A | * | 12/1990 | |

(Continued)

*Primary Examiner* — David M Sinclair
*Assistant Examiner* — Daniel M Dubuisson
(74) *Attorney, Agent, or Firm* — Morgan, Lewis & Bockius LLP

(57) ABSTRACT

A multilayer capacitor includes a body including dielectric layers and internal electrodes and external electrodes disposed on an external surface of the body and connected to the internal electrodes. The body includes a first surface and a second surface to which the internal electrodes are exposed, the first surface and the second surface opposing each other in a first direction, a third surface and a fourth surface opposing each other in a second direction which is a direction in which the dielectric layers are stacked, and a fifth surface and a sixth surface opposing each other in a third direction. At least one of the internal electrodes include a first bottleneck structure having a first directional length of a third-directional outer region smaller than an inner region thereof and a second bottleneck structure having a third directional length of a first directional outer region smaller than an inner region thereof.

27 Claims, 8 Drawing Sheets

(51) Int. Cl.
*H01G 4/248* (2006.01)
*H01G 4/30* (2006.01)

(56) References Cited

U.S. PATENT DOCUMENTS

| | | | | |
|---|---|---|---|---|
| 2012/0113563 A1* | 5/2012 | Kuroda | .................. | H01G 4/012 |
| | | | | 361/328 |
| 2012/0307414 A1 | 12/2012 | Kim et al. | | |
| 2012/0320496 A1* | 12/2012 | Shin | ....................... | H01G 4/005 |
| | | | | 361/321.2 |
| 2014/0022696 A1* | 1/2014 | Banno | ................... | H01G 4/015 |
| | | | | 361/301.4 |
| 2014/0174806 A1* | 6/2014 | Park | ........................ | H01G 2/06 |
| | | | | 361/321.2 |
| 2014/0293501 A1* | 10/2014 | Jeong | .................... | H01G 4/012 |
| | | | | 361/301.4 |
| 2016/0104575 A1* | 4/2016 | Nakazawa | ............. | H01G 4/232 |
| | | | | 361/301.4 |
| 2016/0126013 A1* | 5/2016 | Park | ....................... | H01G 4/232 |
| | | | | 361/301.4 |
| 2016/0240317 A1* | 8/2016 | Ro | ........................... | H01G 4/30 |
| 2018/0075968 A1* | 3/2018 | Nakanishi | ............. | H01G 4/248 |
| 2019/0252119 A1* | 8/2019 | Hasegawa | .............. | H01G 4/012 |
| 2021/0202172 A1* | 7/2021 | Kanzaki | ................. | H01G 4/008 |
| 2021/0351757 A1* | 11/2021 | Kobayashi | ........... | H03H 7/0115 |

FOREIGN PATENT DOCUMENTS

| | | | | |
|---|---|---|---|---|
| JP | 2002-299148 A | | 10/2002 | |
| JP | 2002299148 A | * | 10/2002 | ............... H01G 4/12 |
| JP | 2006190774 A | * | 7/2006 | ............... H01G 4/12 |
| KR | 20140038916 A | * | 3/2014 | |
| KR | 20160058509 A | * | 5/2016 | |
| KR | 10-1832490 B1 | | 2/2018 | |

* cited by examiner

MULTILAYER CAPACITOR HAVING INTERNAL ELECTRODE WITH DOUBLE BOTTLENECK STRUCTURE

CROSS-REFERENCE TO RELATED APPLICATION

This application claims benefit of priority to Korean Patent Application No. 10-2020-0131113 filed on Oct. 12, 2020 in the Korean Intellectual Property Office, the disclosure of which is incorporated herein by reference in its entirety.

TECHNICAL FIELD

The present disclosure relates to a multilayer capacitor.

BACKGROUND

A capacitor is a device capable of storing electricity which is basically based on a principle that electricity is accumulated in each of two facing electrodes when a voltage is applied thereto. When a direct current (DC) voltage is applied, current flows in the capacitor, while electricity is accumulated therein, and when accumulating is completed, no current flows. Meanwhile, when an alternating current (AC) voltage is applied, AC current flows, while polarities of electrodes alternate.

Capacitors may be classified into various types such as an aluminum electrolytic capacitor in which electrodes are formed of aluminum and a thin oxide film is provided between the aluminum electrodes, a tantalum capacitor using tantalum as a material of electrodes, a ceramic capacitor using a high-k dielectric material such as titanium, barium, or the like, between electrodes, a multilayer ceramic capacitor (MLCC) using a multilayer structure of high-k ceramics as a dielectric material provided between electrodes, a film capacitor using a polystyrene film as a dielectric material between electrodes, and the like.

Among the capacitors, the MLCC advantageously has excellent temperature characteristics and frequency characteristics, may be implemented in a small size, and thus has been widely applied in various fields such as high-frequency circuits. In recent years, attempts to implement a smaller multilayer ceramic capacitor have continued, and to this end, a dielectric layer and an internal electrode are formed to be thin.

Meanwhile, recently, many attempts have been made to reduce moisture resistance reliability and cracks caused due to occurrence of stress during board mounting.

SUMMARY

An aspect of the present disclosure may provide a multilayer capacitor having improved reliability (e.g., moisture resistance reliability) against an external influence.

An aspect of the present disclosure may also provide a multilayer capacitor having improved structural stability by reducing cracks when mounted on a board or the like.

According to an aspect of the present disclosure, a multilayer capacitor may include a body including a multilayer structure of a plurality of dielectric layers and a plurality of internal electrodes stacked with the dielectric layer interposed therebetween, and external electrodes disposed on an external surface of the body and connected to the internal electrodes. The body may include a first surface and a second surface to which the plurality of internal electrodes are exposed, the first surface and the second surface opposing each other in a first direction, a third surface and a fourth surface opposing each other in a second direction which is a direction in which the plurality of dielectric layers are stacked, and a fifth surface and a sixth surface opposing each other in a third direction crossing the first and second directions. At least one of the plurality of internal electrodes may include a first bottleneck structure and a second bottleneck structure. A first directional length of a third directional outer region of the first bottleneck structure may be smaller than a first directional length of an inner region of the first bottleneck structure, and a third directional length of a first directional outer region of the second bottleneck structure may be smaller than a third directional length of an inner region of the second bottleneck structure The first and second bottleneck structures may be connected to each other, and an outer surface of the first bottleneck structure and an outer surface of the second bottleneck structure may be discontinuous.

The second bottleneck structure may be connected to the external electrodes.

The first bottleneck structure may have a shape recessed inwardly into the body in the first direction, and the second bottleneck structure may have a shape recessed inwardly into the body in the third direction.

Outer surfaces of the first and second bottleneck structures may include planes inclined with respect to the first and fifth surfaces.

The first bottleneck structure may have a shape reduced in the first directional length toward the outside of the body in the third direction.

The second bottleneck structure may have a shape reduced in the third directional length toward the outside of the body in the first direction.

The first bottleneck structure may be provided in both regions of the one of the plurality of internal electrodes adjacent to the first and second surfaces.

A shape of a portion of the first bottleneck structure provided in the region adjacent to the first surface and a shape of a portion provided in the region adjacent to the second surface may be different from each other.

The second bottleneck structure may be provided in both regions of the one of the plurality of internal electrodes adjacent to the fifth and sixth surfaces.

The first and second bottleneck structures may be connected to each other by a connection portion which overlaps the external electrodes in the third direction.

The first bottleneck structure may have a substantially flat portion having a predetermined third directional length in the one of the plurality of internal electrodes.

The substantially flat portion may be connected to the second bottleneck structure.

The substantially flat portion may provide an outermost surface in the one of the plurality of internal electrode in the third direction.

C/L may be 0.069 or greater, in which C is a first directional length from the substantially flat portion to the second bottleneck structure and L is a first-directional length of the body.

C may be greater than B, in which C is a first directional length from the substantially flat portion to the second bottleneck structure and B is a first-directional length of the second bottleneck structure.

D/W may be 0.013 or greater, in which D is a length of the first bottleneck structure in the third direction and W is a length of the body in the third direction.

According to an aspect of the present disclosure, a multilayer capacitor may include a body including a multilayer structure of dielectric layers and first and second internal electrodes with the dielectric layer interposed therebetween, the body including a first surface and a second surface to which the first internal electrodes and the second internal electrodes are respectively exposed, the first surface and the second surface opposing each other in a first direction, a third surface and a fourth surface opposing each other in a second direction which is a direction in which the dielectric layers are stacked, and a fifth surface and a sixth surface opposing each other in a third direction crossing the first and second directions; a first external electrode disposed on the first surface and connected to the first internal electrodes, and including band portions respectively extending on a portion of the fifth surface and a portion of the sixth surface; and a second external electrode disposed on the second surface and connected to the second internal electrodes, and including band portions respectively extending on another portion of the fifth surface and another portion of the sixth surface. One of the first internal electrodes may include a substantially flat portion facing one of the fifth surface and the sixth surface. In the first internal electrode, the substantially flat portion may have a greatest length in the first direction. The substantially flat portion may be disposed in a region spaced part from a region between the band portions of the first external electrode.

The one of the first internal electrode may further include one or more substantially flat portions disposed between the substantially flat portion and the first surface.

The one or more substantially flat portions may be inclined with respect to the first surface and the one of the fifth surface and the sixth surface.

The one of the first internal electrode may further include another substantially flat portion disposed between the substantially flat portion and the first surface, and the another substantially flat portion may extend substantially parallel to the first direction.

Ends of the another substantially flat portion opposing each other in the first direction may be respectively connected to curved portions of the one of the first internal electrodes.

A portion of the another substantially flat portion may be disposed in the region between the band portions of the first external electrode, and another portion of the another substantially flat portion may be disposed outside the region between the band portions of the first external electrode.

According to an aspect of the present disclosure, a multilayer capacitor may include a body including a multilayer structure of dielectric layers and first and second internal electrodes with the dielectric layer interposed therebetween, the body including a first surface and a second surface to which the first internal electrodes and the second internal electrodes are respectively exposed, the first surface and the second surface opposing each other in a first direction, a third surface and a fourth surface opposing each other in a second direction which is a direction in which the dielectric layers are stacked, and a fifth surface and a sixth surface opposing each other in a third direction crossing the first and second directions; a first external electrode disposed on the first surface and connected to the first internal electrodes, and including band portions respectively extending on a portion of the fifth surface and a portion of the sixth surface; and a second external electrode disposed on the second surface and connected to the second internal electrodes, and including band portions respectively extending on another portion of the fifth surface and another portion of the sixth surface. A length in the third direction of a first portion, which extends substantially along the first direction, of one of the first internal electrodes, may be less than a length in the third direction of a central portion of the one of the first internal electrodes, and may be greater than a length in the third direction of a second portion, which is in contact with the first external electrode, of the one of the first internal electrodes.

A portion of the first portion may be disposed in a region between the band portions of the first external electrode, and another portion of the first portion may be disposed outside the region between the band portions of the first external electrode.

Ends of the first portion opposing each other in the first direction may be respectively connected to curved portions of the one of the first internal electrodes.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
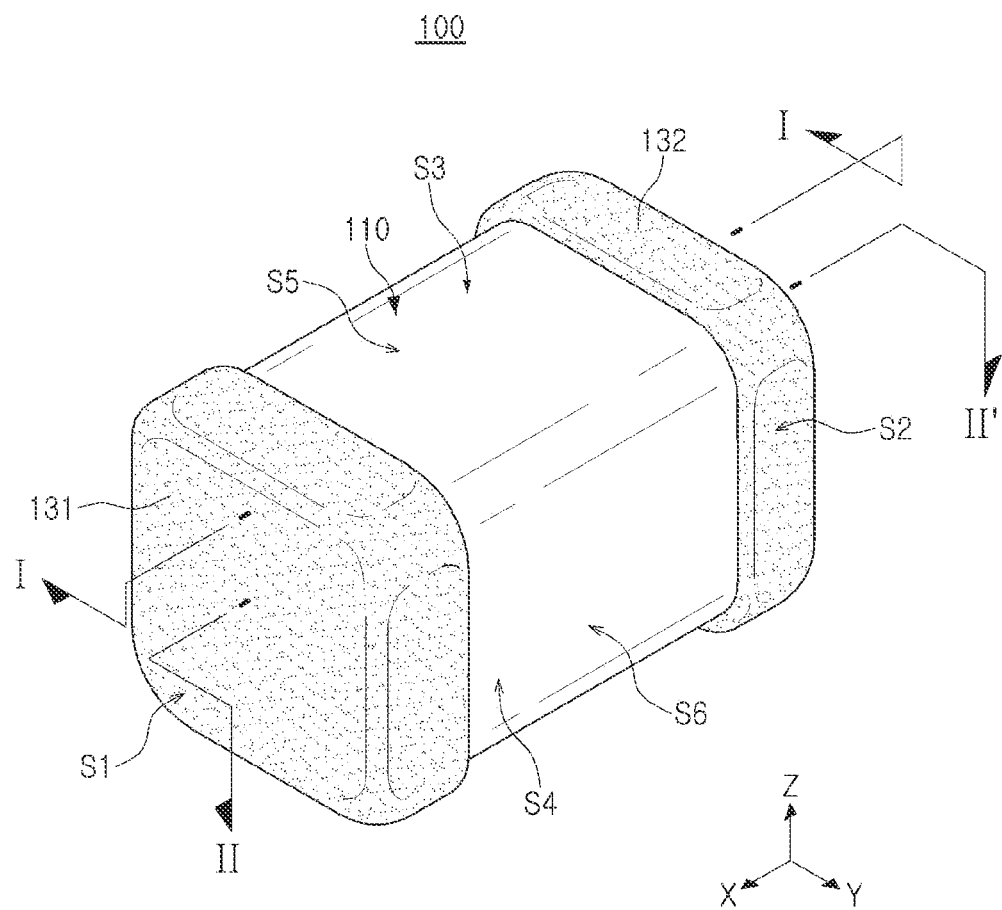
FIG. 1 is a perspective view schematically illustrating an appearance of a multilayer capacitor according to an exemplary embodiment in the present disclosure.
Figure 2:
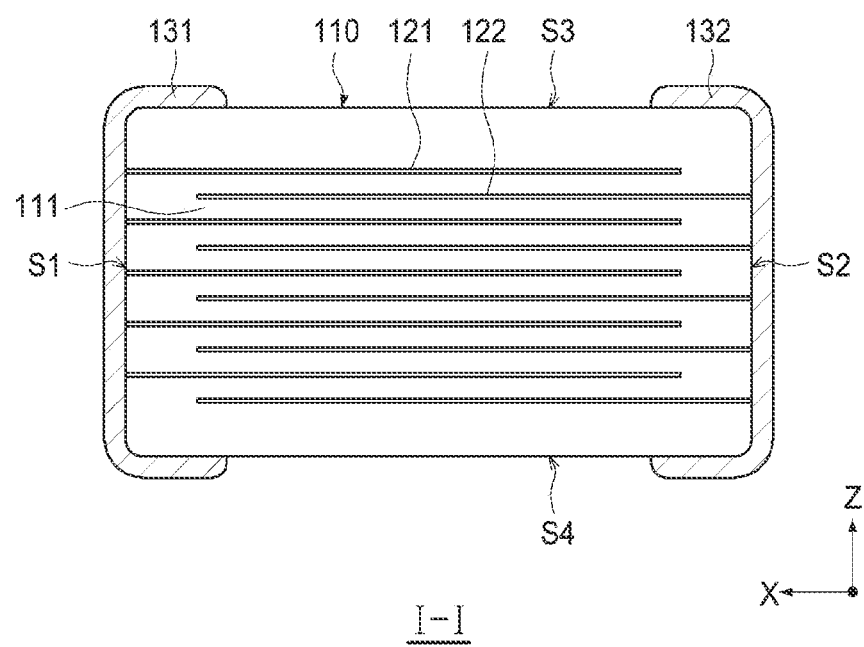
FIG. 2 is a cross-sectional view of the multilayer capacitor of FIG. 1, taken along line I-I'.
Figure 3:
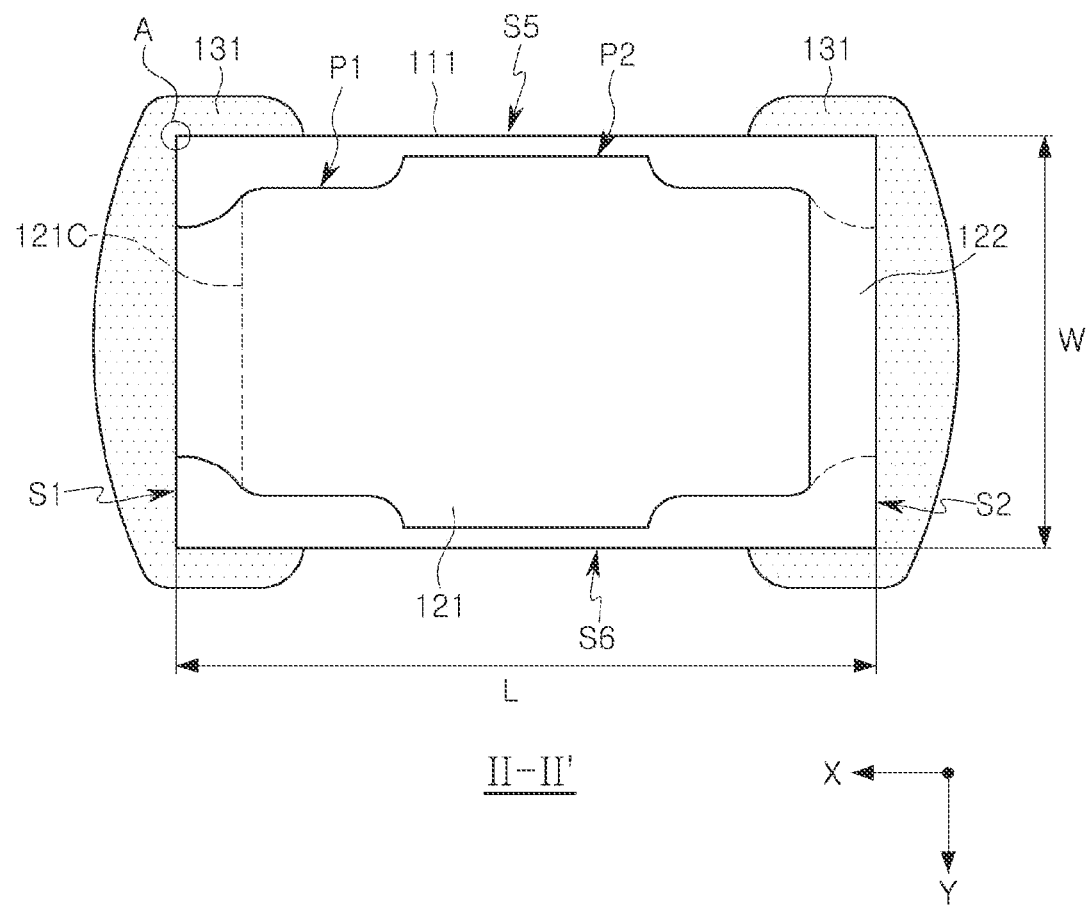
FIG. 3 is a cross-sectional view of the multilayer capacitor of FIG. 1, taken along line and FIG. 4 separately illustrates one internal electrode of FIG. 3.
Figure 5:
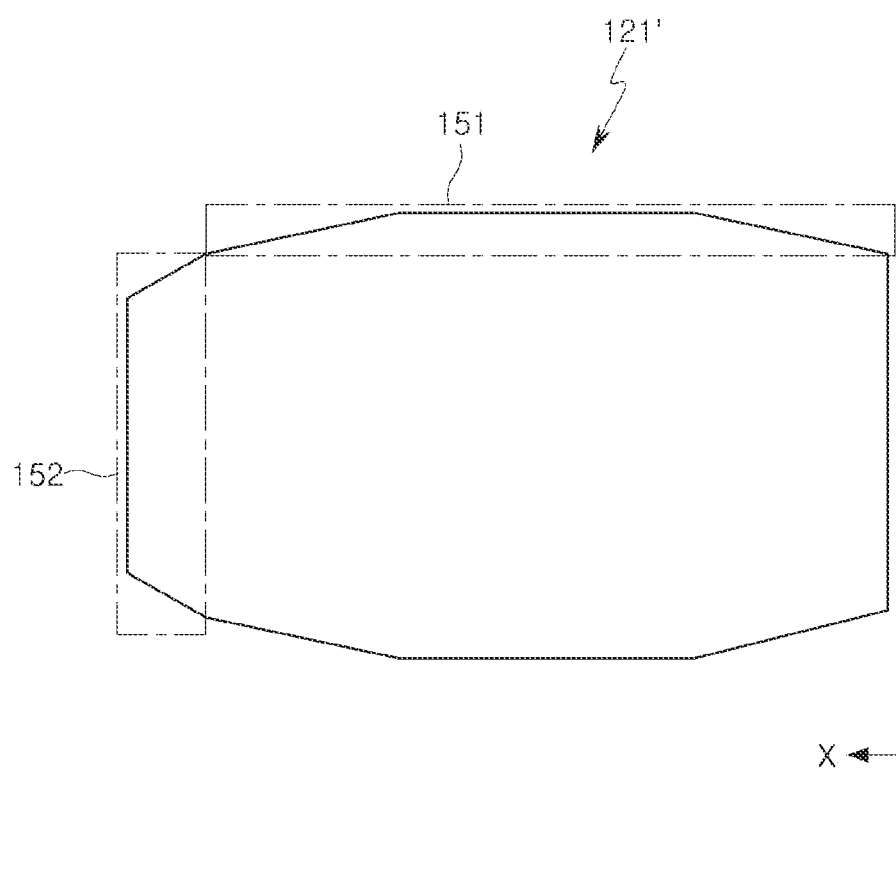
FIGS. 5 and 6 illustrate internal electrodes that may be employed in a modified embodiment.
Figure 6:
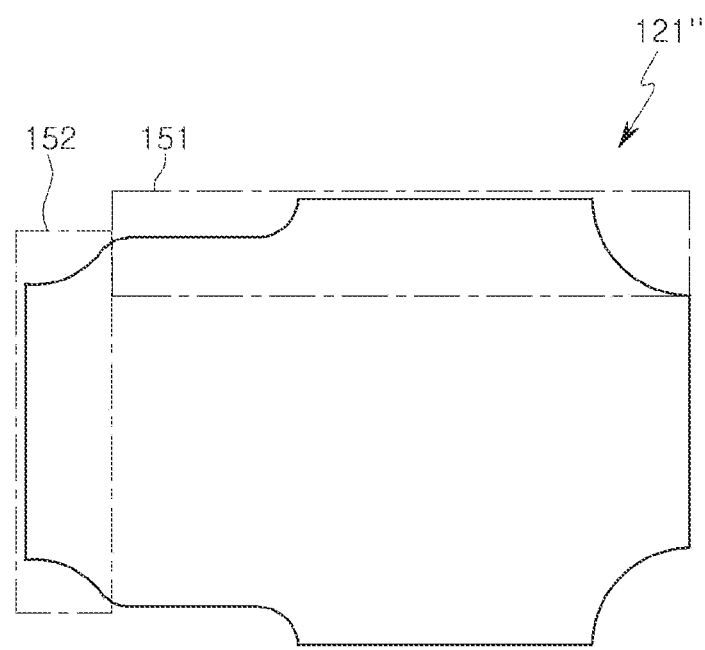

FIG. 1 is a perspective view schematically illustrating an appearance of a multilayer capacitor according to an exemplary embodiment in the present disclosure. FIG. 2 is a cross-sectional view of the multilayer capacitor of FIG. 1, taken along line I-I'. FIG. 3 is a cross-sectional view of the multilayer capacitor of FIG. 1, taken along line II-II', and FIG. 4 separately illustrates one internal electrode of FIG. 3. FIGS. 5 and 6 illustrate internal electrodes that may be employed in a modified embodiment.

Referring to FIGS. 1 to 3, a multilayer capacitor 100 according to an exemplary embodiment in the present disclosure includes a body 110 including a dielectric layer 111 and a plurality of internal electrodes 121 and 122 stacked with the dielectric layer 111 interposed therebetween and external electrodes 131 and 132, and at least some of the plurality of internal electrodes 121 and 122 have bottleneck structures 151 and 152. In other words, a plurality of bottleneck structures 151 and 152 are formed in at least part of the plurality of internal electrodes 121 and 122.

The body 110 includes a multilayer structure in which a plurality of dielectric layers 111 are stacked and may be obtained, for example, by stacking a plurality of green sheets and then sintering the plurality of green sheets. Through the sintering process, the plurality of dielectric layers 111 may have an integrated form. The shape and dimensions of the body 110 and the number of stacked dielectric layers 111 are not limited to those shown in this exemplary embodiment. For example, as shown in FIG. 1, the body 110 may have a shape similar to a rectangular parallelepiped. The body 110 includes a first surface S1 and a second surface S2 to which the internal electrodes 121 and 122 are exposed, respectively, the first surface S1 and the second surface S2 opposing each other in a first direction (X direction), a third surface S3 and a fourth surface S4 opposing each other in a second direction (Z direction) which is a direction in which the plurality of dielectric layers 111 are stacked, and a fifth surface S5 and a sixth surface S6 opposing each other in a third direction (Y direction) perpendicular to the first and second directions.

The dielectric layer 111 included in the body 110 may include a ceramic material having a high dielectric constant, for example, BT-based, i.e., a barium titanate ($BaTiO_3$)-based ceramic, but other materials known in the art may also be used as long as sufficient capacitance is obtained. The dielectric layer 111 may further include an additive, an organic solvent, a plasticizer, a binder, and a dispersant, if necessary, along with such a ceramic material as a main ingredient. Here, the additive may include a metal component and may be added in the form of a metal oxide during a manufacturing process. An example of such a metal oxide additive may include at least one of $MnO_2$, $Dy_2O_3$, BaO, MgO, $Al_2O_3$, $SiO_2$, $Cr_2O_3$, and $CaCO_3$.

The plurality of internal electrodes 121 and 122 may be obtained by printing a paste containing a conductive metal to a predetermined thickness on one surface of a ceramic green sheet and then sintering the paste. In this case, as shown in FIG. 2, the plurality of internal electrodes 121 and 122 may include first and second internal electrodes 121 and 122 respectively exposed to a first surface S1 and a second surface S2 of the body 110 opposing each other. Here, the first and second internal electrodes 121 and 122 may be connected to different external electrodes 131 and 132 to have opposite polarities when driven, and may be electrically separated from each other by a dielectric layer 111 disposed therebetween. However, the number of the external electrodes 131 and 132 or a method for connecting the external electrodes with the internal electrodes 121 and 122 may vary according to exemplary embodiments. The main ingredient materials of the internal electrodes 121 and 122 may include nickel (Ni), copper (Cu), palladium (Pd), silver (Ag), and the like, and alloys thereof may also be used.

The external electrodes 131 and 132 may be formed on an external surface of the body 110 and may include first and second external electrodes 131 and 132 connected to the first and second internal electrodes 121 and 122, respectively. The external electrodes 131 and 132 may be formed by a method of preparing a material containing a conductive metal as a paste and then applying the paste to the body 110. Examples of the conductive metal include nickel (Ni), copper (Cu), palladium (Pd), gold (Au), or alloys thereof. Here, at least one plating layer including Ni, Sn, or the like may be formed on a thusly formed electrode layer.

Figure 4:
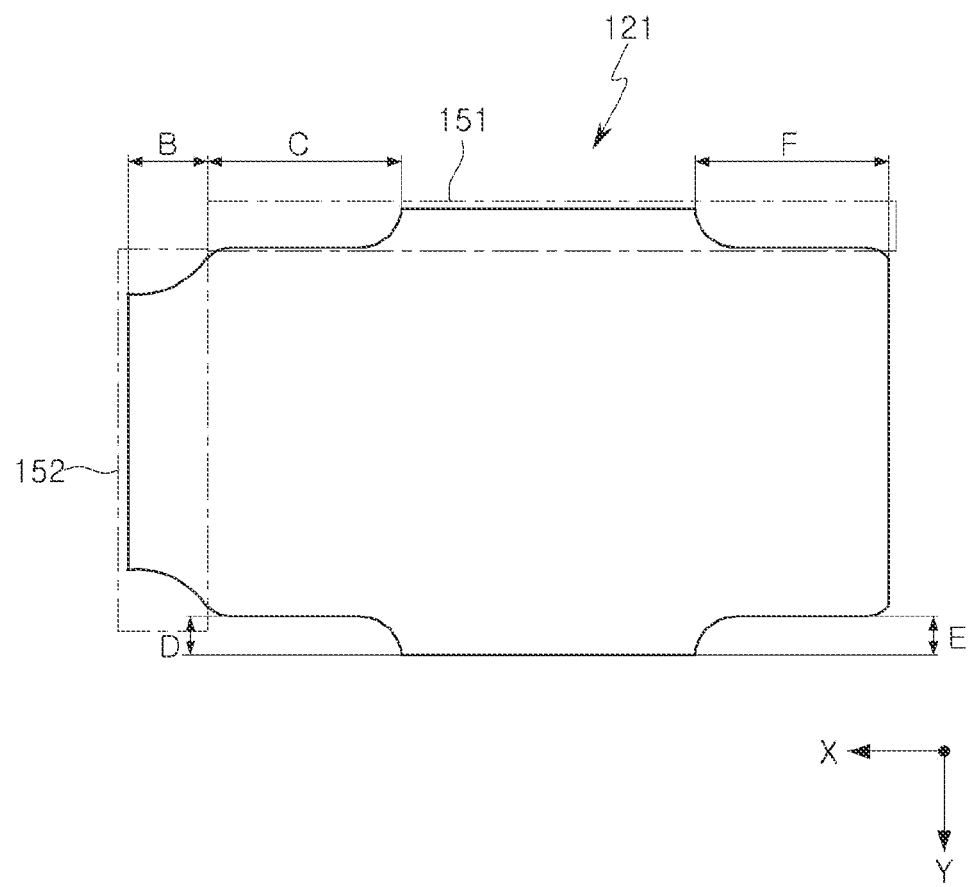

Referring to FIGS. 3 and 4, in the present exemplary embodiment, at least some of the plurality of internal electrodes 121 and 122 have first and second bottleneck structures 151 and 152. In the first bottleneck structure 151, an outer region in the third direction (Y direction) has a length smaller in the first direction (X direction) than an inner region. In the second bottleneck structure 152, an outer region in the first direction (X direction) has a length smaller in the third direction (Y direction) than an inner region. In this case, the second bottleneck structure 152 of the first internal electrode 121 may be connected to the first external electrode 131 and the second bottleneck structure 152 of the second internal electrode 122 may be connected to the second external electrode 132, and FIG. 3 shows a configuration in which the second bottleneck structure 152 is connected to the first external electrode 131.

As the plurality of bottleneck structures, i.e., the first and second bottleneck structures 151 and 152, are formed in the internal electrodes 121 and 122, moisture resistance reliability of the multilayer capacitor 100 may be improved, and the reason for such an effect is because a distance between the corner A regions of the body 110 that moisture or the like may easily penetrate and the internal electrodes 121 and 122 increases. In this case, when the bottleneck structures 151 and 152 are formed in the internal electrodes 121 and 122, capacitance may be reduced. However, the reduction in capacitance may be minimized by optimizing the shape of the first and second bottleneck structures 151 and 152, and details thereof will be described layer. Meanwhile, the bottleneck structures 151 and 152 having the aforementioned shape may also be formed in the second internal electrode 122 and the following description may also be applied to the second internal electrode 122.

As illustrated, the first and second bottleneck structures 151 and 152 may be connected to each other. In this case, an outer surface of the first bottleneck structure 151 and an outer surface of the second bottleneck structure 152 may be discontinuous. This means that the outer surfaces of the first and second bottleneck structures 151 and 152 do not form one continuous surface but form separate bottleneck structures from each other.

The first bottleneck structure 151 may have a shape recessed inwardly into the body 110 in the first direction (X direction). Similarly, the second bottleneck structure 152 may have a shape recessed into the body 110 in the third direction (Y direction). In other words, the outer surfaces of the first and second bottleneck structures 151 and 152 have the shape recessed inwardly into the body 110, rather than being convex outward of the body 110, whereby an interval between the corner A of the body 110 and the internal electrodes 121 and 122 may be increased within a range in which a reduction of capacitance is minimized, thus improving moisture resistance reliability and stress stability of the multilayer capacitor 100.

Meanwhile, in the exemplary embodiment of FIGS. 3 and 4, the outer surfaces of the first and second bottleneck structures 151 and 152 have a structure including a curved surface, but the shape may be modified as long as the bottleneck shape is maintained. For example, as shown in FIG. 5, an internal electrode 121' includes first and second bottleneck structures 151 and 152 in a modified shape, and outer surfaces of the first and second bottleneck structures 151 and 152 each include a plane, and such a plane is inclined with respect to the first surface S1 and the fifth surface S5 (or the sixth surface S6) of the body 110. In this case, slopes of the outer surfaces of the first and second bottleneck structures 151 and 152 may be different from each other.

Referring back to FIGS. 3 and 4, the shapes of the first and second bottleneck structures 151 and 152 will be described in detail. First, in the first bottleneck structure 151, a length thereof in the first direction (X direction) is reduced toward an outer side of the body 110 in the third direction (Y direction). Similarly, in the second bottleneck structure 152, a length thereof in the third direction (Y direction) is reduced toward the outer side of the body 110 in the first direction (X direction). Here, however, the length of the first and second bottleneck structures 151 and 152 does not have to gradually change in one direction, and if the bottleneck structure is maintained as a whole, the length may be uniform in a partial region.

In addition, the first bottleneck structure 151 may be formed in both regions of the internal electrodes 121 and 122 adjacent to the first surface S1 and the second surface S2. In addition, the second bottleneck structure 152 may be formed in both regions of the internal electrodes 121 and 122 adjacent to the fifth surface S5 and the sixth surface S6. In this case, as illustrated, the portion of the first bottleneck structure 151 formed in the region adjacent to the first surface S1 and the portion of the first bottleneck structure 151 formed in the region adjacent to the second surface S2 may have the same shape. However, as shown in FIG. 6, in an internal electrode 121" of an example modified according to the need for design, a shape of a portion formed in a region adjacent to the first surface S1 and shapes of both portions formed in a region adjacent to the second surface S2 may be different from each other, and this is the same with the second bottleneck structure 152. When generalized, this means that, in FIG. 4, length C and length F may be the same as or different from each other, and similarly, length D and length E may be the same as or different from each other. The definitions of the lengths C, D, E, and F will be described later.

As described above, in this exemplary embodiment, the plurality of bottleneck structures 151 and 152 are formed on the internal electrodes 121 and 122 within a range in which capacitance may be sufficiently secured. For this design, size conditions for the first and second bottleneck structures 151 and 152 may be determined. Specifically, a connection portion 121C in which the first and second bottleneck structures 151 and 152 are connected to each other may overlap the external electrodes 131 and 132 (for example, band portions of the external electrodes 131 and 132) in the third direction (Y direction), which corresponds to the first external electrode 131 in FIG. 3. In this case, in the first direction (X direction), the length C of the first bottleneck structure 151, from an edge of a flat portion P2 of the first bottleneck structure 151 to the second bottleneck structure 152, may be longer than the length B of the second bottleneck structure 152. This condition considers that a reduction in capacitance may be noticeable if the length of the first bottleneck structure 151 increases to an extent not to overlap the first external electrode 131.

As illustrated, the first bottleneck structure 151 may have a flat portion P1 having a first constant length in the third direction (Y direction) in the internal electrodes 121 and 122, and the flat portion P2 having a second constant length in the third direction (Y direction) in the internal electrodes 121 and 122. The first constant length may be less than the second constant length. In this case, among the flat portions P1 and P2, the first flat portion P1 is connected to the second bottleneck structure 152. The first flat portion P1 may be provided in a region connected to the second bottleneck structure 152 and may be employed for the purpose of mitigating a sudden change in shape that may occur on the outer surfaces of the internal electrodes 121 and 122. Also, among the flat portions P1 and P2, the second flat portion P2 forms the outermost surface in the third direction (Y direction) in the internal electrodes 121 and 122. The second flat portion P2 may be employed for the purpose of contributing to improvement of capacitance by obtaining a sufficient overlap area between the internal electrodes 121 and 122. In one example, a flat portion may refer to an ideal flat portion or a perfect flat portion or may also refer to a substantially flat portion. Each or both of the flat portions P1 and P2, or an edge of each or both of the flat portions P1 and P2 may extend substantially along or parallel to the first direction (X direction). In one example, "substantially flat," "substantially along," "substantially parallel," and the like, may include an ideal or perfect case in which "substantially" may be omitted, and may also include a non-ideal or imperfect case in which a process/measurement error or margin recognizable by one of ordinary skill in the art exists.

In the present exemplary embodiment, length conditions of the first and second bottleneck structures 151 and 152 may be selected in an optimum range in consideration of moisture resistance reliability, a crack incidence, a capacitance characteristic, and the like. Specifically, referring to FIGS. 3 and 4, when a length in the first direction (X direction) connecting the first flat portion P1 and the second bottleneck structure 152 is C and a length in the first direction (X direction) of the body 110 is L, C/L may be 0.069 or greater. In addition, in relation to a relative length condition of the first and second bottleneck structures 151 and 152, when a length of the second bottleneck structure 152 in the first direction (X direction) is B, C may be greater than B. This is because, as described above, if the length of the second bottleneck structure 152 excessively increases, capacitance may be significantly reduced.

Also, in the case of a length condition of the first bottleneck structure 151 in the third direction (Y direction), when the length of the first bottleneck structure 151 in the third direction (Y direction) is D and a length of the body 110 in the third direction (Y direction) is W, D/W may be 0.013 or greater. In a case that the lengths D and E are different, the length of the first bottleneck structure 151 in the third direction (Y direction) may refer to the length D with respect to the second bottleneck structure 152 or an average of the length D and the length E.

The inventors of the present disclosure measured capacitance, crack incidence, and moisture resistance reliability while changing the length conditions of the first and second bottleneck structures 151 and 152 as follows. First, Table 1 below shows the length conditions of the bottleneck parts used in the reference and Examples. Here, reference sample (Ref.) is a case where each ratio value is 0 which corresponds to a structure including only a second bottleneck structure without a first bottleneck structure, in which internal electrodes, other than the second bottleneck part, may have a rectangular shape in a top view.

TABLE 1

|  | C/L | F/L | D/W | E/W |
|---|---|---|---|---|
| Ref. | 0 | 0 | 0 | 0 |
| Example 1 | 0.035 | 0.035 | 0.006 | 0.006 |
| Example 2 | 0.069 | 0.069 | 0.013 | 0.013 |
| Example 3 | 0.104 | 0.104 | 0.063 | 0.063 |
| Example 4 | 0.139 | 0.139 | 0.125 | 0.125 |
| Example 5 | 0.208 | 0.208 | 0.188 | 0.188 |

Table 2 below shows results of an experiment as to whether cracks occurred in the exterior based on a cover area of a body before manufactured MLCC samples are mounted on a board. As a result of the experiment, it can be seen that a defect rate was reduced in the Examples employing the first bottleneck structure compared to the case (Ref.) where the first bottleneck structure was not employed, and, in particular, the defect rate was zero (0) when the aforementioned C/L condition and the D/W condition were satisfied.

TABLE 2

|          | Number of samples | Number of external cracks | Defect rate (ppm) |
|----------|-------------------|---------------------------|-------------------|
| Ref.     | 400               | 7                         | 17500             |
| Example 1| 400               | 6                         | 15000             |
| Example 2| 400               | 1                         | 2500              |
| Example 3| 400               | 0                         | 0                 |
| Example 4| 400               | 0                         | 0                 |
| Example 5| 400               | 0                         | 0                 |

Table 3 below shows results of an experiment as to whether cracks occurred due to stress or the like caused by warpage of a board after the manufactured MLCC samples were mounted on the board. Similar to the results of the above experiment result, it can be seen that, in the results of the mounting crack experiment, a defect rate was reduced in the Examples employing the first bottleneck structure compared to the case (Ref.) where the first bottleneck structure was not employed, and, in particular, the defect rate was zero (0) when the aforementioned C/L condition and the D/W condition were satisfied.

TABLE 3

|          | Number of samples | Number of mounting cracks | Defect rate (ppm) |
|----------|-------------------|---------------------------|-------------------|
| Ref.     | 1000              | 3                         | 3000              |
| Example 1| 1000              | 3                         | 3000              |
| Example 2| 1000              | 1                         | 1000              |
| Example 3| 1000              | 0                         | 0                 |
| Example 4| 1000              | 0                         | 0                 |
| Example 5| 1000              | 0                         | 0                 |

Table 4 below shows results of an experiment as to whether moisture resistance of the manufactured MLCC samples were defective, and here, a resistance characteristic (IR) of the body, in particular, the cover area, was measured and a sample with a resistance value lower than a reference value was determined as being defective. It can be seen that, in the results of the experiment of the moisture resistance defect, a defect rate was reduced in the Examples employing the first bottleneck structure compared to the case (Ref.) where the first bottleneck structure was not employed, and, in particular, the defect rate was zero (0) when the aforementioned C/L condition and the D/W condition were satisfied.

TABLE 4

|          | Number of samples | Number of defective moisture resistance | Defect rate (ppm) |
|----------|-------------------|-----------------------------------------|-------------------|
| Ref.     | 1200              | 4                                       | 333.333           |
| Example 1| 1200              | 1                                       | 833.3333          |
| Example 2| 1200              | 0                                       | 0                 |
| Example 3| 1200              | 0                                       | 0                 |
| Example 4| 1200              | 0                                       | 0                 |
| Example 5| 1200              | 0                                       | 0                 |

Next, as shown in Table 5 below, capacitance of Ref., Example 2, and Example 5 was measured. Referring to the results of Table 5, it can be seen that a degradation of capacitance in Examples employing a plurality of bottleneck parts was not salient and sufficient capacitance was secured, compared with Ref. having only one bottleneck structure.

TABLE 5

| | Capacitance (Ref. Percentage over first results) | | |
|----------|---------|---------|---------|
|          | First   | Second  | Third   |
| Ref.     | 100.0%  | 96.9%   | 96.1%   |
| Example 2| 96.5%   | 97.8%   | 99.7%   |
| Example 5| 99.1%   | 98.3%   | 98.3%   |

Figure 7:
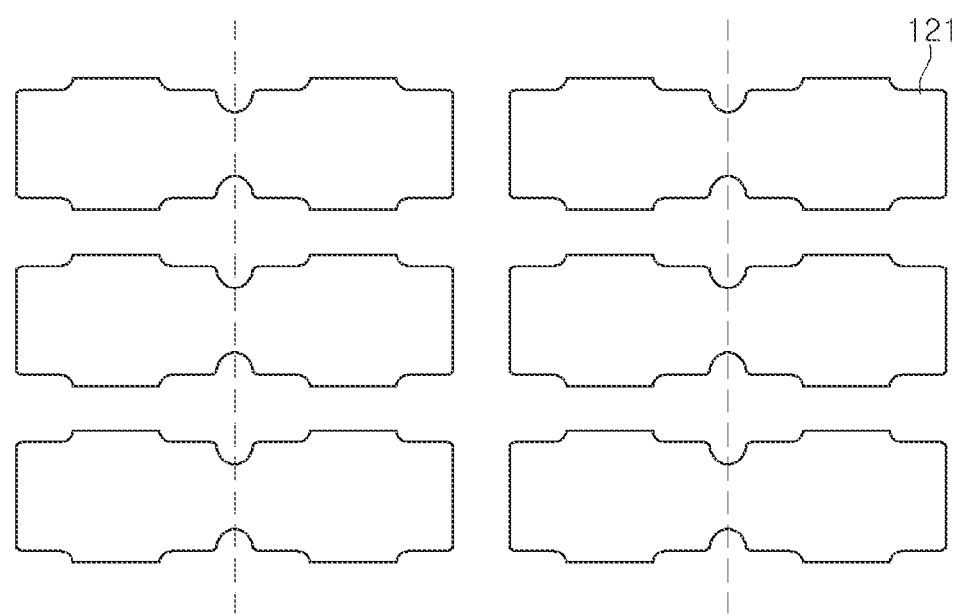
FIGS. 7 and 8 illustrate shapes of a conductive pattern for forming internal electrodes as part of a process of manufacturing a multilayer capacitor according to an exemplary embodiment in the present disclosure.
Figure 8:
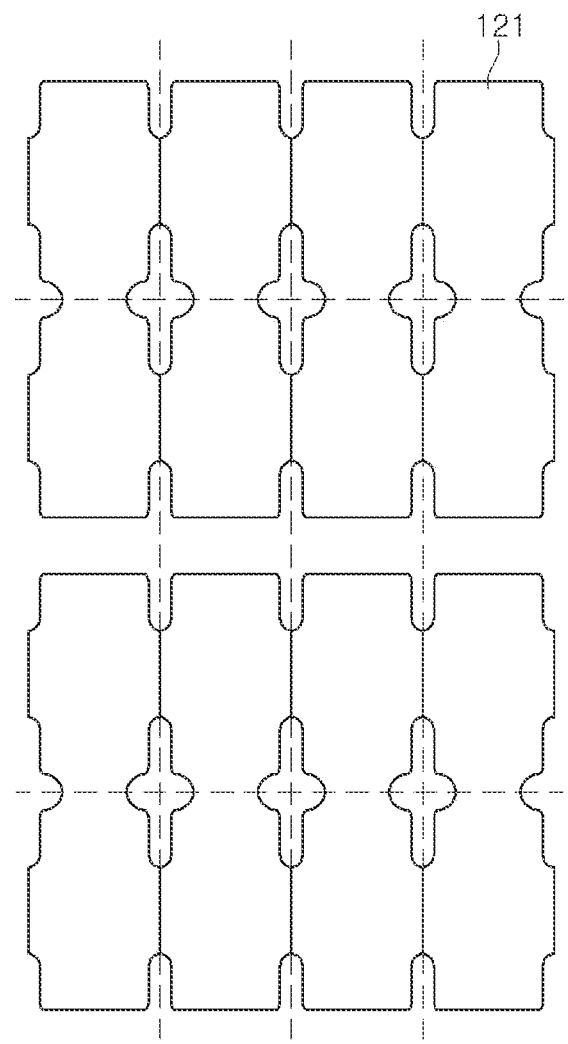

Meanwhile, FIGS. 7 and 8 illustrate shapes of a conductive pattern for forming internal electrodes as part of a process of manufacturing a multilayer capacitor according to an exemplary embodiment in the present disclosure.

In order to form the body 110, the dielectric layer 111 and the internal electrodes 121 and 122 are stacked to form a ceramic laminate, and here, the dielectric layer 111 is in a ceramic green sheet state before firing. The ceramic green sheet may be prepared by mixing ceramic powder, a binder, a solvent, etc to prepare a slurry and the slurry may be manufactured in a sheet type having a thickness of several μm or less than 1 μm by a doctor blade method. The ceramic green sheet may then be sintered to form the dielectric layer 111.

A patterned internal electrode 121 may be formed by applying a conductive paste for an internal electrode on the ceramic green sheet. In this case, the internal electrode 121 may be formed by a screen printing method or a gravure printing method. The conductive paste for an internal electrode may include a conductive metal and an additive, and the additive may be at least one of a non-metal or a metal oxide. The conductive metal may include nickel. The additive may include barium titanate or strontium titanate as a metal oxide.

FIG. 7 shows a form in which the conductive paste for forming the internal electrode 121 is applied, and two internal electrodes 121 are connected to each other. In a state in which the dielectric layer and the conductive paste are stacked, the laminate may be diced into individual component units to realize the internal electrode having a plurality of bottleneck structures. Thereafter, the ceramic green sheet laminate may be fired, and then external electrodes may be formed to be connected to the internal electrodes 121 to complete a multilayer capacitor.

Meanwhile, FIG. 8 shows a state of applying a conductive paste in which more internal electrodes 121 are connected to each other. First bottleneck structures of the internal electrodes 121 are connected, and when cut into individual component units, the first bottleneck structures may be exposed to outside of the dielectric layer. A side marginal part may be formed to cover exposed side surfaces of the internal electrodes 121. The side marginal part may be formed of the same ceramic material as the dielectric layer 111.

As set forth above, the multilayer capacitor according to exemplary embodiments in the present disclosure may have improved reliability (e.g., moisture resistance reliability) against an influence from the outside. In addition, or separately, when mounted on a board, cracks may be reduced to improve structural stability.

While exemplary embodiments have been shown and described above, it will be apparent to those skilled in the art that modified embodiments and variations could be made without departing from the scope of the present disclosure as defined by the appended claims.

What is claimed is:

1. A multilayer capacitor comprising:
a body including a multilayer structure of a plurality of dielectric layers and a plurality of internal electrodes stacked with the dielectric layers interposed therebetween; and
external electrodes disposed on an external surface of the body and connected to the internal electrodes,
wherein the body includes a first surface and a second surface to which the plurality of internal electrodes are exposed, the first surface and the second surface opposing each other in a first direction, a third surface and a fourth surface opposing each other in a second direction which is a direction in which the plurality of dielectric layers are stacked, and a fifth surface and a sixth surface opposing each other in a third direction crossing the first and second directions, and
at least one of the plurality of internal electrodes includes a first bottleneck structure and a second bottleneck structure,
a first directional length of a third directional outer region of the first bottleneck structure is smaller than a first directional length of an inner region of the first bottleneck structure,
a third directional length of a first directional outer region of the second bottleneck structure is smaller than a third directional length of an inner region of the second bottleneck structure,
the inner region of the first bottleneck structure and the inner region of the second bottleneck structure are spaced apart from each other in the first direction,
an end of the inner region of the second bottleneck structure adjacent to the fifth surface is farther from the fifth surface in the third direction than the third directional outer region of the first bottleneck structure, and
the first directional outer region of the second bottleneck structure is exposed from an outermost surface of the body in the first direction.

2. The multilayer capacitor of claim 1, wherein
the first and second bottleneck structures are connected to each other, and an outer surface of the first bottleneck structure and an outer surface of the second bottleneck structure are discontinuous.

3. The multilayer capacitor of claim 1, wherein
the second bottleneck structure is connected to the external electrodes.

4. The multilayer capacitor of claim 1, wherein
the first bottleneck structure has a shape recessed inwardly into the body in the first direction, and the second bottleneck structure has a shape recessed inwardly into the body in the third direction.

5. The multilayer capacitor of claim 1, wherein
outer surfaces of the first and second bottleneck structures include planes inclined with respect to the first and fifth surfaces.

6. The multilayer capacitor of claim 1, wherein
the first bottleneck structure has a shape reduced in the first directional length toward the outside of the body in the third direction.

7. The multilayer capacitor of claim 1, wherein
the second bottleneck structure has a shape reduced in the third directional length toward the outside of the body in the first direction.

8. The multilayer capacitor of claim 1, wherein
the first bottleneck structure is provided in both regions of the one of the plurality of internal electrodes adjacent to the first and second surfaces.

9. The multilayer capacitor of claim 8, wherein
a shape of a portion of the first bottleneck structure provided in the region adjacent to the first surface and a shape of a portion of the first bottleneck structure provided in the region adjacent to the second surface are different from each other.

10. The multilayer capacitor of claim 1, wherein
the second bottleneck structure is provided in both regions of the one of the plurality of internal electrodes adjacent to the fifth and sixth surfaces.

11. The multilayer capacitor of claim 1, wherein
the first and second bottleneck structures are connected to each other by a connection portion which overlaps one of the external electrodes in the third direction.

12. The multilayer capacitor of claim 1, wherein
D/W is 0.013 or greater, in which D is a length of the first bottleneck structure in the third direction and W is a length of the body in the third direction.

13. A multilayer capacitor comprising:
a body including a multilayer structure of a plurality of dielectric layers and a plurality of internal electrodes stacked with the dielectric layers interposed therebetween; and
external electrodes disposed on an external surface of the body and connected to the internal electrodes,
wherein the body includes a first surface and a second surface to which the plurality of internal electrodes are exposed, the first surface and the second surface opposing each other in a first direction, a third surface and a fourth surface opposing each other in a second direction which is a direction in which the plurality of dielectric layers are stacked, and a fifth surface and a sixth surface opposing each other in a third direction crossing the first and second directions, and
at least one of the plurality of internal electrodes includes a first bottleneck structure and a second bottleneck structure,
a first directional length of a third directional outer region of the first bottleneck structure is smaller than a first directional length of an inner region of the first bottleneck structure,
a third directional length of a first directional outer region of the second bottleneck structure is smaller than a third directional length of an inner region of the second bottleneck structure,
the first bottleneck structure has a first substantially flat portion having a predetermined third directional length in the one of the plurality of internal electrodes,
the second bottleneck structure has a second substantially flat portion, and
the first and second substantially flat portions are each inclined relative to the first direction at different angles.

14. The multilayer capacitor of claim 13, wherein
the first substantially flat portion is connected to the second bottleneck structure.

15. The multilayer capacitor of claim 13, wherein
the first substantially flat portion provides an outermost surface in the one of the plurality of internal electrodes in the third direction.

16. The multilayer capacitor of claim 15, wherein
C/L is 0.069 or greater, in which C is a first directional length from the first substantially flat portion to the second bottleneck structure and L is a first-directional length of the body.

17. The multilayer capacitor of claim 15, wherein
C is greater than B, in which C is a first directional length from the first substantially flat portion to the second bottleneck structure and B is a first-directional length of the second bottleneck structure.

18. A multilayer capacitor comprising:
a body including a multilayer structure of dielectric layers and first and second internal electrodes with the dielectric layers interposed therebetween, the body including a first surface and a second surface to which the first internal electrodes and the second internal electrodes are respectively exposed, the first surface and the second surface opposing each other in a first direction, a third surface and a fourth surface opposing each other in a second direction which is a direction in which the dielectric layers are stacked, and a fifth surface and a sixth surface opposing each other in a third direction crossing the first and second directions;
a first external electrode disposed on the first surface and connected to the first internal electrodes, and including first band portions respectively extending on a portion of the fifth surface and a portion of the sixth surface; and
a second external electrode disposed on the second surface and connected to the second internal electrodes, and including second band portions respectively extending on another portion of the fifth surface and another portion of the sixth surface,
wherein one of the first internal electrodes includes a substantially flat portion facing, and spaced apart from, the fifth surface and the sixth surface in the third direction,
in the first internal electrode, the substantially flat portion has a greatest length in the first direction,
the substantially flat portion is disposed in a region spaced apart from a region between the first band portions of the first external electrode,
the one of the first internal electrode further includes one or more second substantially flat portions disposed between the substantially flat portion and the first surface so as to be spaced apart from the first surface in the first direction, and
the substantially flat portion facing one of the fifth or sixth surface is closer to the fifth or sixth surface in the third direction than the one or more second substantially flat portions.

19. The multilayer capacitor of claim 18, wherein
the one or more second substantially flat portions are inclined with respect to the first surface and the one of the fifth surface and the sixth surface.

20. The multilayer capacitor of claim 18, wherein the one or more second substantially flat portions extends substantially parallel to the first direction.

21. The multilayer capacitor of claim 20, wherein
ends of the one or more second substantially flat portions opposing each other in the first direction are respectively connected to curved portions of the one of the first internal electrodes.

22. The multilayer capacitor of claim 20, wherein
a portion of the one or more second substantially flat portions is disposed in the region between the first band portions of the first external electrode, and another portion of the one or more second substantially flat portions is disposed outside the region between the first band portions of the first external electrode.

23. A multilayer capacitor comprising:
a body including a multilayer structure of dielectric layers and first and second internal electrodes with the dielectric layers interposed therebetween, the body including a first surface and a second surface to which the first internal electrodes and the second internal electrodes are respectively exposed, the first surface and the second surface opposing each other in a first direction, a third surface and a fourth surface opposing each other in a second direction which is a direction in which the dielectric layers are stacked, and a fifth surface and a sixth surface opposing each other in a third direction crossing the first and second directions;
a first external electrode disposed on the first surface and connected to the first internal electrodes, and including first band portions respectively extending on a portion of the fifth surface and a portion of the sixth surface; and
a second external electrode disposed on the second surface and connected to the second internal electrodes, and including second band portions respectively extending on another portion of the fifth surface and another portion of the sixth surface,
wherein a length in the third direction of a first portion, having an edge which extends substantially along the first direction, of one of the first internal electrodes, is less than a length in the third direction of a central portion of the one of the first internal electrodes, and is greater than a length in the third direction of a second portion, which is in contact with the first external electrode, of the one of the first internal electrodes,
wherein the first portion is arranged between the central portion and the second portion in the first direction, and
wherein the central portion is not directly connected to an external electrode in the third direction.

24. The multilayer capacitor of claim 23, wherein
a portion of the first portion is disposed in a region between the first band portions of the first external electrode, and another portion of the first portion is disposed outside the region between the first band portions of the first external electrode.

25. The multilayer capacitor of claim 23, wherein
ends of the first portion opposing each other in the first direction are respectively connected to curved portions of the one of the first internal electrodes.

26. A multilayer capacitor comprising:
a body including a multilayer structure of dielectric layers and first and second internal electrodes with the dielectric layers interposed therebetween, the body including a first surface and a second surface to which the first internal electrodes and the second internal electrodes are respectively exposed, the first surface and the second surface opposing each other in a first direction, a third surface and a fourth surface opposing each other in a second direction which is a direction in which the dielectric layers are stacked, and a fifth surface and a sixth surface opposing each other in a third direction crossing the first and second directions;
a first external electrode disposed on the first surface and connected to the first internal electrodes, and including first band portions respectively extending on a portion of the fifth surface and a portion of the sixth surface; and
a second external electrode disposed on the second surface and connected to the second internal electrodes, and including second band portions respectively extending on another portion of the fifth surface and another portion of the sixth surface,
wherein one of the first internal electrodes includes a substantially flat portion facing one of the fifth surface and the sixth surface, in the first internal electrode, the substantially flat portion has a greatest length in the first direction, the substantially flat portion is disposed in a region spaced apart from a region between the first band portions of the first external electrode, the one of the first internal electrode further includes another substantially flat portion disposed between the substantially flat portion and the first surface, the another substantially flat portion extends substantially parallel to the first direction, and ends of the another substantially flat portion opposing each other in the first direction are respectively connected to curved portions of the one of the first internal electrodes.

27. A multilayer capacitor comprising:

a body including a multilayer structure of dielectric layers and first and second internal electrodes with the dielectric layers interposed therebetween, the body including a first surface and a second surface to which the first internal electrodes and the second internal electrodes are respectively exposed, the first surface and the second surface opposing each other in a first direction, a third surface and a fourth surface opposing each other in a second direction which is a direction in which the dielectric layers are stacked, and a fifth surface and a sixth surface opposing each other in a third direction crossing the first and second directions;

a first external electrode disposed on the first surface and connected to the first internal electrodes, and including first band portions respectively extending on a portion of the fifth surface and a portion of the sixth surface; and a second external electrode disposed on the second surface and connected to the second internal electrodes, and including second band portions respectively extending on another portion of the fifth surface and another portion of the sixth surface, wherein one of the first internal electrodes includes a substantially flat portion facing, and spaced apart from, one of the fifth surface and the sixth surface in the third direction, in the first internal electrode, the substantially flat portion has a greatest length in the first direction, the substantially flat portion is disposed in a region spaced apart from a region between the first band portions of the first external electrode, the one of the first internal electrode further includes another substantially flat portion disposed between the substantially flat portion and the first surface, the another substantially flat portion extends substantially parallel to the first direction, a portion of the another substantially flat portion is disposed in the region between the first band portions of the first external electrode, and another portion of the another substantially flat portion is disposed outside the region between the first band portions of the first external electrode, and the substantially flat portion facing one of the fifth or sixth surface is closer to the fifth or sixth surface in the third direction than the another substantially flat portion.

* * * * *